US012633004B2

(12) United States Patent
Yi et al.

(10) Patent No.: US 12,633,004 B2
(45) Date of Patent: May 19, 2026

(54) METHOD, APPARATUS, DEVICE AND STORAGE MEDIUM FOR IMAGE GENERATION

(71) Applicant: Beijing Zitiao Network Technology Co., Ltd., Beijing (CN)

(72) Inventors: Zili Yi, Beijing (CN); Qian He, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 169 days.

(21) Appl. No.: 18/572,340

(22) PCT Filed: Aug. 31, 2022

(86) PCT No.: PCT/CN2022/116004
§ 371 (c)(1),
(2) Date: Dec. 20, 2023

(87) PCT Pub. No.: WO2023/030348
PCT Pub. Date: Mar. 9, 2023

(65) Prior Publication Data
US 2024/0289999 A1 Aug. 29, 2024

(30) Foreign Application Priority Data

Aug. 31, 2021 (CN) .......................... 202111015596.9

(51) Int. Cl.
*G06T 1/00* (2006.01)
*G06N 3/084* (2023.01)
*G06T 11/00* (2006.01)

(52) U.S. Cl.
CPC .............. *G06T 11/00* (2013.01); *G06N 3/084* (2013.01); *G06T 2211/441* (2023.08)

(58) Field of Classification Search
CPC ..... G06T 15/005; G06T 19/00; G06T 11/001; G06T 11/40; G06T 11/60; G06T 17/20;
(Continued)

(56) References Cited

U.S. PATENT DOCUMENTS 9,367,763 B1 * 6/2016 Gordo Soldevila ... G06V 20/62
10,713,821 B1 * 7/2020 Surya ..................... G06N 3/045
(Continued)

FOREIGN PATENT DOCUMENTS

CN 110096641 A 8/2019
CN 110176050 A 8/2019
(Continued)

OTHER PUBLICATIONS

International Search Report (with English translation) and Written Opinion issued in PCT/CN2022/116004, dated Nov. 30, 2022, 9 pages provided.
(Continued)

*Primary Examiner* — Gordon G Liu
(74) *Attorney, Agent, or Firm* — Astute IP Law Group

(57) ABSTRACT

The disclosure discloses a method, an apparatus, a device and a storage medium for image generation which comprise: obtaining a target text and an image to be matched; inputting the same into an image-text matching model to obtain an image-text matching degree; in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree; in response to a determination that the image-text matching degree satisfies the predetermined condition,
(Continued)

determining the image to be matched satisfying the predetermined condition as a target image; and pushing the target image and the target text to a user.

17 Claims, 2 Drawing Sheets

(58) Field of Classification Search
CPC ....... G06T 1/60; G06T 2210/52; G06T 11/00;
G06T 2211/441; G06F 40/30; G06F
40/56; G06F 18/214; G06N 3/084; Y02T
10/40
USPC ........................................................ 345/418
See application file for complete search history.

(56) References Cited

U.S. PATENT DOCUMENTS

| | | | |
|---|---|---|---|
| 2019/0138805 A1 | 5/2019 | Saha et al. | |
| 2020/0019807 A1* | 1/2020 | Ma ........................ | G06V 10/454 |

FOREIGN PATENT DOCUMENTS

| | | | |
|---|---|---|---|
| CN | 110209862 A | 9/2019 |
| CN | 110930469 A | 3/2020 |
| CN | 111260740 A | 6/2020 |
| CN | 111311554 A | 6/2020 |
| CN | 111339734 A | 6/2020 |
| CN | 112148839 A | 12/2020 |
| CN | 112613293 A | 4/2021 |
| CN | 112765316 A | 5/2021 |
| CN | 112765317 A | 5/2021 |
| CN | 113221882 A | 8/2021 |
| CN | 113642673 A | 11/2021 |

OTHER PUBLICATIONS

Office Action issued in Chinese Application No. 202111015596.9, dated Jan. 28, 2023, with machine translation.
Notification to Grant Patent Right for Invention for Chinese Patent Application No. 202111015596.9, mailed on Nov. 26, 2023, 6 pages.

* cited by examiner

METHOD, APPARATUS, DEVICE AND STORAGE MEDIUM FOR IMAGE GENERATION

This application claims priority to the Chinese Patent Application No. 202111015596.9, filed to the Chinese Patent Office on Aug. 31, 2021, which is hereby incorporated by reference in its entirety.

FIELD

Embodiments of the present disclosure relate to the field of image technology, for example, to a method, an apparatus, a device and a storage medium for image generation.

BACKGROUND

Multimedia entertainment is ubiquitous in modern life. The creation of images and videos is showing a booming trend, and the demand for image materials is constantly increasing. The protection of image and video copyrights is also increasing. For multimedia content creation and distribution platforms, it is particularly important to obtain high-quality images that match a text.

SUMMARY

The embodiments of the present disclosure provide a method, an apparatus, a device and a storage medium for image generation to generate an image according to a text, and image diversity may be increased.

In a first aspect, the embodiments of the present disclosure provide a method of image generation, and the method comprises:

obtaining a target text and an image to be matched;

inputting the target text and the image to be matched into an image-text matching model to obtain an image-text matching degree;

in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree;

in response to a determination that the image-text matching degree satisfies the predetermined condition, determining the image to be matched satisfying the predetermined condition as a target image; and pushing the target image and the target text to a user.

In a second aspect, the embodiments of the present disclosure further provide an apparatus for image generation, and the apparatus comprises:

an image to be matched obtaining module configured to obtain a target text and an image to be matched;

an image-text matching degree obtaining module configured to input the target text and the image to be matched into an image-text matching model to obtain an image-text matching degree;

an image to be matched optimizing module configured to, in response to a determination that the image-text matching degree fails to satisfy a predetermined condition, determine an optimization parameter based on a predefined strategy, and optimize the image to be matched based on the optimization parameter to obtain an optimized image to be matched; input the target text and the optimized image to be matched into the image-text matching model to obtain the image-text matching degree;

a target image determining module configured to, in response to a determination that the image-text matching degree satisfies the predetermined condition, determine the image to be matched satisfying the predetermined condition as a target image; and a pushing module configured to push the target image and the target text to a user.

In a third aspect, the embodiments of the present disclosure further provide an electronic device, and the electronic device comprises:

one or more processing devices;

a storage device configured to store one or more programs;

the one or more programs, when executed by the one or more processing devices, cause the one or more processing devices to perform the method of image generation.

In a fourth aspect, the embodiments of the present disclosure further provide a computer-readable medium storing a computer program, the computer program, when executed by a processing device, performs the method of image generation.

In a fifth aspect, the embodiments of the present disclosure provide a computer program product comprising a computer program stored on a computer-readable medium, the computer program comprising a program instruction that, when executed by a computer, performs the method of image generation.

DETAILED DESCRIPTION

It should be understood that the multiple steps described in the method implementation of the present disclosure may be executed in different orders and/or in parallel. In addition, the method implementation may include additional steps and/or omit a shown step. The scope of the present disclosure is not limited in this regard.

The term "comprising" and its variations as used herein are open to comprise, i.e. "comprising but not limited to". The term "based on" means "at least partially based on". The term "one embodiment" means "at least one embodiment"; the term "another embodiment" means "at least one additional embodiment"; and the term "some embodiments" means "at least some embodiments". Relevant definitions of other terms will be given in the following description.

It is to be noted that the concepts of "first" and "second" mentioned in the present disclosure are only used to distinguish different apparatuses, modules, or units, and are not used to limit the order or interdependence of the functions performed by these apparatuses, modules, or units.

It is to be noted that the modifications of "one" and "multiple" mentioned in the present disclosure are illustrative and not restrictive. Those skilled in the art should understand that unless otherwise indicated in the context, they should be understood as "one or more".

Messages or names of the messages exchanged between a plurality of apparatuses in the implementations of the present disclosure are for illustrative purposes only and are not intended to limit the scope of these messages or information.

Figure 1:
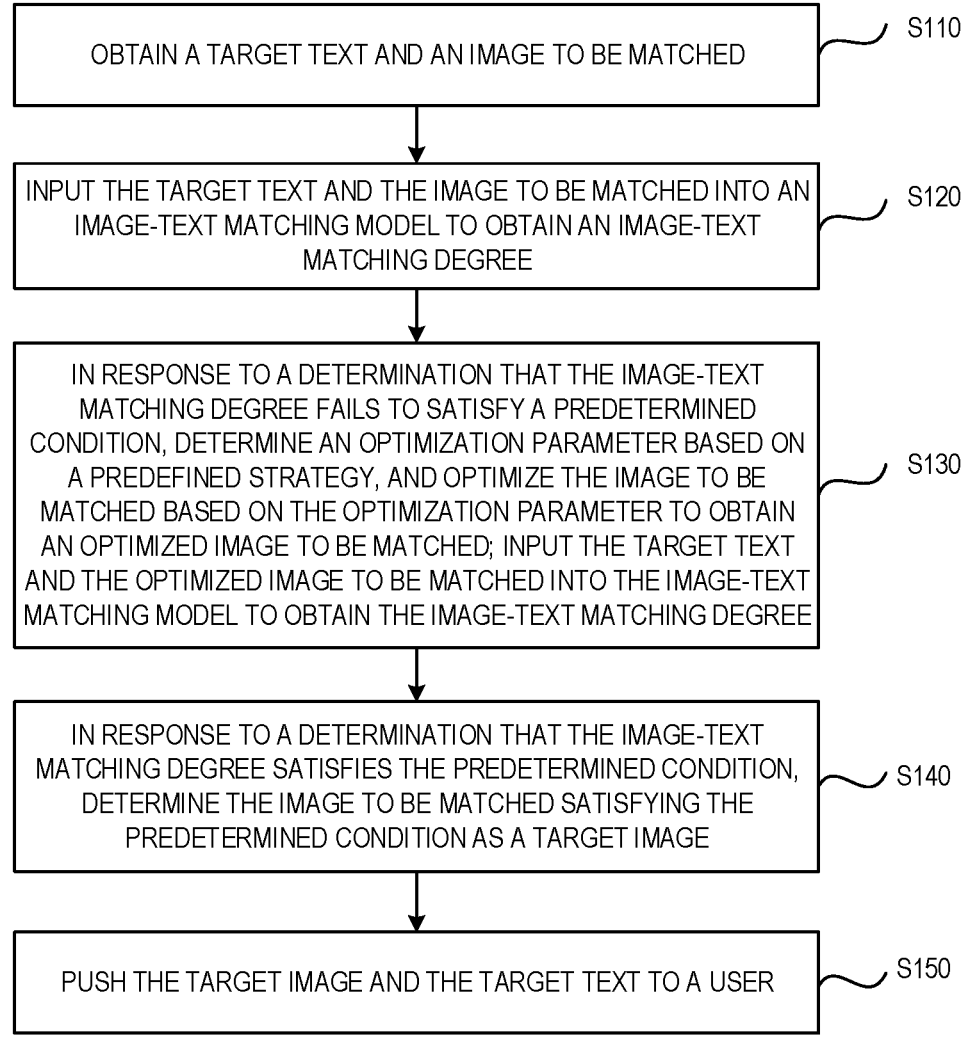
FIG. 1 is a flowchart of a method of image generation in the embodiments of the present disclosure.

FIG. 1 is a flowchart of a method of image generation provided in the embodiments of the present disclosure. The present embodiment may be applied to a case of generating an image based on a text. The method may be performed by an apparatus for image generation, which may be composed of hardware and/or software, and may generally be integrated into a device with an image generation function. The device may be an electronic device such as a server, a mobile terminal, or a server cluster. As shown in FIG. 1, the method includes the following steps:

step 110: obtaining a target text and an image to be matched.

The target text may be a text that a user wants to convert into an image, which may be a poem or a text describing scenery, for example, "Two orioles sing on green willows, a row of egrets soar to the blue sky", "People relaxing with osmanthus flowers falling, and the mountain is ethereal in a tranquil night". The image to be matched may be understood as an image that is intended to match the semantics of the target text through optimization.

In this embodiment, firstly, the image to be matched is initialized, and then the initialized image to be matched is continuously optimized to obtain a final target image with a matching degree satisfies a predetermined condition.

For example, the way to obtain the image to be matched may be generating the image to be matched based on a predetermined random function.

The predetermined random function may be a Gaussian noise function or a salt and pepper noise function. In this embodiment, the image to be matched with a predefined size may be directly generated based on the predetermined random function. For example, an image with a size of 256*256 is generated.

For example, a way to obtain the image to be matched may be inputting a pixel coordinate into a first predetermined neural network to obtain the image to be matched.

The first predetermined neural network may be an SIREN network, which is a fully connected network with a Sin function as an activation function. The principle may be understood as: converting a two-dimensional coordinate (x, y) of the image into an RGB three-channel image. In this embodiment, inputting the two-dimensional coordinate of multiple pixels of the image into the first predetermined neural network may obtain the image to be matched with color.

For example, a way to obtain the image to be matched may be inputting a Gaussian vector into a second predetermined neural network to obtain the image to be matched.

The second predetermined neural network may be Generative Adversarial Networks (GAN), such as a Style Generative Adversarial Networks (StyleGAN). The Gaussian vector may be a Gaussian vector with a smaller size, such as 128-bit or 512-bit, and the output of the second predetermined neural network is an image with a larger size, such as 256*256 or 1024*1024. In this embodiment, the second predetermined neural network may be a trained GAN. Inputting an initial Gaussian vector into the second predetermined neural network may obtain an initial image to be matched. The GAN network may convert the Gaussian vector with a smaller size into a high-quality image with a larger size, which may improve generation efficiency of the image to be matched.

For example, a way to obtain the image to be matched may be inputting a stroke element into a predetermined renderer to obtain the image to be matched.

The renderer may be a renderer constructed based on a renderer function. The principle of the renderer function is to convert a certain number (such as 100) of stroke elements into an RGB image. The function is written based on a predefined rule and does not carry a trainable parameter, which means that it is an immutable renderer. A stroke element includes a feature including a shape, a color, a position, and thickness of a stroke, which may be modeled by a plurality of coordinate points. In this embodiment, the image to be matched is composed of a plurality of stroke elements. The plurality of stroke elements are randomly generated, and the initial image to be matched may be obtained by inputting the plurality of stroke elements into the renderer.

For example, a way to obtain the image to be matched may be randomly selecting a plurality of encoding information from a codebook and inputting the plurality of encoding information into a predetermined decoder to obtain the image to be matched.

The codebook and the decoder may belong to the structure of a Vector Quantised Variational AutoEncoder (VQ-VAE) network. The VQ-VAE includes an Encoder, a codebook, and a Decoder. Its principle may be understood as: the Encoder encodes an input image and obtains first encoding information; and then obtains second encoding information with the highest similarity to the first encoding information from the codebook, inputs the second encoding information into the Decoder, and outputs the target image.

In this embodiment, the predetermined decoder is a decoder after a training, which may synthesize the input encoding information into an image. For example, the plurality of encoding information is randomly selected from the codebook, and then the plurality of encoding information is input into the predetermined decoder to obtain the initial image to be matched.

Step 120: Input the target text and the image to be matched into an image-text matching model to obtain an image-text matching degree.

The image-text matching model is a trained neural network with the function of recognizing the matching degree between a text and an image. The image-text matching degree may be a value between 0 and 1. The closer the value is to 1, the higher the matching degree between the text and the image. Conversely, the closer the value is to 0, the lower the matching degree between the text and the image.

For example, the image-text matching model is trained by: obtaining image data and text data; pairing the image data with the text data to obtain first image-text pairing data as a positive sample; adjusting pairing relationship between the image data and the text data in the first image-text pairing data to obtain second image-text pairing data as a negative sample; and training the image-text matching model based on the positive sample and the negative sample.

In this embodiment, after the image data and the text data are obtained, it is necessary to filter and correct the image data and the text data. For the image data, it is necessary to filter out the image containing a watermark, a subtitle, or structured data, and to filter out the image with unqualified quality and size. For the text data, it is necessary to check the integrity of the text, and to supplement or filter out the incomplete text.

The pairing of the image data and the text data may be done manually. A set of image and text with the highest semantic similarity between the content of the image and the text is paired to obtain the positive sample for training. After obtaining the positive sample, the image-text pairing data in the positive sample is split and randomly paired to obtain the negative sample. For example, assuming that there are 4 sets of image data and text data, 16 sets of image-text pairing data may be obtained, of which 4 are positive samples and 12 are negative samples.

Step 130: in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree.

The image-text matching degree is an image-text matching degree between the target text and the optimized image to be matched.

The predetermined condition may be that the image-text matching degree is greater than or equal to the predefined threshold. The predefined threshold may be set according to actual needs, for example, set to 0.8. The predefined strategy may be a gradient backpropagation strategy, and correspondingly, the optimization parameter may be a gradient value. For example, if the image-text matching degree exceeds the predefined threshold, the image to be matched may be determined as the final target image. If the image-text matching degree fails to exceed the predefined threshold, it indicates that the image to be matched fails to satisfy the requirement and needs to be further optimized.

In this embodiment, the gradient value may be determined based on the gradient backpropagation strategy, and the image to be matched may be optimized based on the gradient value to obtain the optimized image to be matched.

The principle of the gradient backpropagation strategy may be to recursively compute the gradient value based on the computed loss value in the corresponding neural network. In this embodiment, the loss value may be the loss between the image-text matching degree and the target matching degree, where the target matching degree is 1.

For example, if the initial image to be matched is generated based on the predetermined random function, the gradient value may be understood as a change amount of color values of a plurality of pixels in the image to be matched. The process of determining the gradient value based on the gradient backpropagation strategy may be understood as computing the gradient backpropagation strategy with the target text, the image to be matched, the image-text matching model, and the loss value as elements to obtain the gradient value.

For example, if the initial image to be matched is obtained by inputting the pixel coordinate into the first predetermined neural network, the gradient value may be understood as the change amount of a parameter in the first predetermined neural network. The process of determining the gradient value based on the gradient backpropagation strategy may be understood as computing the gradient backpropagation strategy with the target text, the image to be matched, the image-text matching model, the first predetermined neural network, and the loss value as elements to obtain the gradient value.

For example, if the initial image to be matched is obtained by inputting the Gaussian vector into the second predetermined neural network, and the gradient value may be understood as the change amount of the Gaussian vector. The process of determining the gradient value based on the gradient backpropagation strategy may be understood as computing the gradient backpropagation strategy using the target text, the image to be matched, the image-text matching model, the second predetermined neural network, and the loss value as elements to obtain the gradient value.

For example, if the initial image to be matched is obtained by inputting a stroke element into a predetermined renderer, and the gradient value may be understood as the change amount of the stroke element. The process of determining the gradient value based on the gradient backpropagation strategy may be understood as computing the gradient backpropagation strategy with the target text, the image to be matched, the image-text matching model, the predetermined renderer, and the loss value as elements to obtain the gradient value.

For example, if the initial image to be matched is obtained by randomly selecting a plurality of encoding information from the codebook and inputting the plurality of encoding information into the predetermined decoder, the gradient value may be understood as the amount of change in the encoding information. The process of determining the gradient value based on the gradient backpropagation strategy may be understood as computing the gradient backpropagation strategy with the target text, the image to be matched, the image-text matching model, the predetermined decoder, and the loss value as elements to obtain the gradient value.

For example, if the initial image to be matched is generated based on the predetermined random function, the optimizing the image to be matched based on the gradient value to obtain an optimized image to be matched comprises adjusting the color values of the plurality of pixels in the image to be matched based on the gradient value to obtain the optimized image to be matched.

The gradient value is represented in the form of a matrix, and each element in the matrix is the change amount of a corresponding pixel color value. After adjusting the color values of the plurality of pixels in the image to be matched based on the gradient value, a new image to be matched may be obtained. The new image to be matched is an optimized image, and the image-text matching degree with the target text is closer to the target matching degree, that is, 1.

For example, if the initial image to be matched is obtained by inputting the pixel coordinate into the first predetermined neural network, the process of determining a gradient value based on a gradient backpropagation strategy, and optimizing the image to be matched based on the gradient value to obtain the optimized image to be matched may be: determining a first gradient value based on the gradient backpropagation strategy; adjusting a parameter in the first predetermined neural network based on the first gradient value; and inputting the pixel coordinate into the adjusted first predetermined neural network to obtain the optimized image to be matched.

In this embodiment, adjusting the first predetermined neural network may be understood as optimizing the first predetermined neural network, so that the image-text matching degree between the image to be matched and the target text output by the optimized first predetermined neural network is closer to 1. The image to be matched is optimized by adjusting the parameter of the first predetermined neural network.

For example, if the initial image to be matched is obtained by inputting the Gaussian vector into the second predetermined neural network, then the determining a gradient value based on a gradient backpropagation strategy, and optimizing the image to be matched based on the gradient value to obtain the optimized image to be matched may be: determining a second gradient value based on the gradient backpropagation strategy; adjusting the Gaussian vector based on the second gradient value; and inputting the adjusted Gaussian vector into the second predetermined neural network to obtain the optimized image to be matched.

The second predetermined neural network have a function of generating an image, and the generated image content is related to the input Gaussian vector. By adjusting the Gaussian vector to optimize the image to be matched, the image-text matching degree between the optimized image to be matched and the target text is closer to 1.

For example, if the initial image to be matched is obtained by inputting the stroke element into the predetermined renderer, the process of determining a gradient value based on a gradient backpropagation strategy, and optimizing the image to be matched based on the gradient value to obtain an optimized image to be matched may be: determining a third gradient value based on the gradient backpropagation strategy; adjusting the stroke element based on the third gradient value; and inputting the adjusted stroke element into the predetermined renderer to obtain the optimized image to be matched.

The predetermined renderer has the function of generating an image based on the stroke element. In this embodiment, due to the input stroke element, the image output by the predetermined renderer is similar to a watercolor painting or a landscape ink painting. By adjusting the stroke element to optimize the image to be matched, the image-text matching degree between the optimized image to be matched and the target text is closer to 1.

For example, if the initial image to be matched is obtained by randomly selected from the plurality of encoding information from the codebook, and inputting the plurality of encoding information into the predetermined decoder, the process of determining a gradient value based on a gradient backpropagation strategy, and optimizing the image to be matched based on the gradient value to obtain an optimized image to be matched may be: determining a fourth gradient value based on the gradient backpropagation strategy; updating the plurality of encoding information based on the fourth gradient value; and inputting the updated plurality of encoding information into the predetermined decoder to obtain the optimized image to be matched.

The updated plurality of encoding information is stored in the codebook. For example, updating the plurality of encoding information based on the fourth gradient value may be: adjusting the plurality of encoding information based on the fourth gradient value, and then obtaining the encoding information with the highest similarity to the adjusted encoding information from the codebook as the updated plurality of encoding information. In this embodiment, by updating the plurality of encoding information input to the predetermined decoder to optimize the image to be matched, the image-text matching degree between the optimized image to be matched and the target text is closer to 1.

In this embodiment, after obtaining the optimized image to be matched, return to perform that inputting the target text and the optimized image to be matched into the trained image-text matching model to obtain the image-text matching degree and deciding whether the image-text matching degree satisfies the predetermined condition, until the image-text matching degree satisfies the predetermined condition.

Step 140: in response to a determination that the image-text matching degree satisfies the predetermined condition, determining the image to be matched satisfying the predetermined condition as the target image.

For example, determine the image to be matched with the image-text matching degree exceeding the predefined threshold as the target image.

Step 150: push the target image and the target text to a user.

In this embodiment, the target image and the target text may be pushed to the user respectively, or the target text may be added to the target image and then pushed to the user; or the target text may be attached around (for example, above, below, on the left of or on the right of) the target image and then pushed to the user.

In the technical solution of the present disclosure, the target text and the image to be matched are obtained; the target text and the image to be matched are input into the image-text matching model to obtain the image-text matching degree; in response to a determination that the image-text matching degree fails to satisfy the predetermined condition, the optimization parameter is determined based on the predefined strategy, and the image to be matched is optimized based on the optimization parameter to obtain an optimized image to be matched; the target text and the optimized image to be matched are input into the image-text matching model to obtain the image-text matching degree; in response to a determination that the image-text matching degree satisfies the predetermined condition, the image to be matched satisfying the predetermined condition is determined as the target image; and the target image and the target text are pushed to the user. In the method of image generation provided in the embodiments of the present disclosure, the optimization parameter is determined based on the predefined strategy, and the image to be matched is optimized based on the optimization parameter. When the matching degree between the image to be matched and the target text satisfies the predefined condition, the target image is obtained, which may not only satisfy the semantic consistency between the generated image and the text description, but also improve the accuracy of the generated image.

Figure 2:
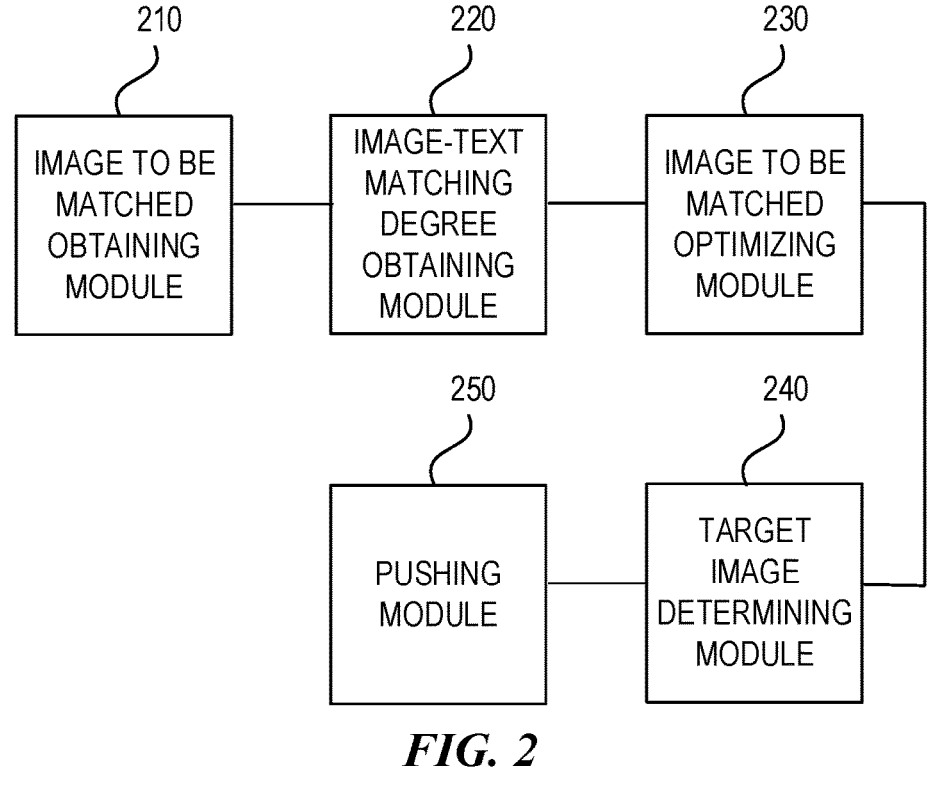
FIG. 2 is a schematic diagram of the structure of an apparatus for image generation in the embodiments of the present disclosure.

FIG. 2 is a schematic diagram of the structure of an apparatus for image generation provided by the embodiments of the present disclosure. As shown in FIG. 2, the apparatus comprises:

an image to be matched obtaining module 210 configured to obtain a target text and an image to be matched;

an image-text matching degree obtaining module 220 configured to input the target text and the image to be matched into an image-text matching model to obtain an image-text matching degree;

an image to be matched optimizing module 230 configured to, in response to a determination that the image-text matching degree fails to satisfy a predetermined condition, determine an optimization parameter based on a predefined strategy, and optimize the image to be matched based on the optimization parameter to obtain an optimized image to be matched; input the target text and the optimized image to be matched into the image-text matching model to obtain the image-text matching degree;

a target image determining module 240 configured to, in response to a determination that the image-text matching degree satisfies the predetermined condition, determine the image to be matched satisfying the predetermined condition as a target image; and a pushing module 250 configured to push the target image and the target text to a user.

For example, the image to be matched optimizing module 230 is further configured to: determine a gradient value based on a gradient backpropagation strategy, and optimize the image to be matched based on the gradient value to obtain the optimized image to be matched.

For example, the image to be matched obtaining module 210 is further configured to: generate the image to be matched based on a predetermined random function.

For example, the gradient value is a change amount of color values of a plurality of pixels in the image to be matched. The image to be matched optimizing module 230 is further configured to:

adjust the color values of the plurality of pixels in the image to be matched based on the gradient value to obtain the optimized image to be matched.

For example, the image to be matched obtaining module 210 is further configured to:

input a pixel coordinate into a first predetermined neural network to obtain the image to be matched;

for example, the image to be matched optimizing module 230 is further configured to:

determine a first gradient value based on the gradient backpropagation strategy;

adjust a parameter in the first predetermined neural network based on the first gradient value; and input the pixel coordinate into the adjusted first predetermined neural network to obtain the optimized image to be matched.

For example, the image to be matched obtaining module 210 is further configured to:

input a Gaussian vector into a second predetermined neural network to obtain the image to be matched;

for example, the image to be matched optimizing module 230 is further configured to:

determine a second gradient value based on the gradient backpropagation strategy;

adjust the Gaussian vector based on the second gradient value; and input the adjusted Gaussian vector into the second predetermined neural network to obtain the optimized image to be matched.

For example, the image to be matched obtaining module 210 is further configured to:

inputting a stroke element into a predetermined renderer to obtain the image to be matched;

for example, the image to be matched optimizing module 230 is further configured to:

determine a third gradient value based on the gradient backpropagation strategy;

adjust the stroke element based on the third gradient value; and input the adjusted stroke element into the predetermined renderer to obtain the optimized image to be matched.

For example, the image to be matched obtaining module 210 is further configured to:

randomly select a plurality of encoding information from a codebook, and input the plurality of encoding information into a predetermined decoder to obtain the image to be matched;

for example, the image to be matched optimizing module 230 is further configured to:

determine a fourth gradient value based on the gradient backpropagation strategy;

update the plurality of encoding information based on the fourth gradient value; and input the updated plurality of encoding information into the predetermined decoder to obtain the optimized image to be matched; wherein the updated plurality of encoding information is stored in the codebook.

For example, the apparatus further comprises an image-text matching model training module configured to:

obtain image data and text data;

pair the image data with the text data to obtain first image-text pairing data as a positive sample;

adjust pairing relationship between the image data and the text data in the first image-text pairing data to obtain second image-text pairing data as a negative sample; and train the image-text matching model based on the positive sample and the negative sample.

The above apparatus may implement the methods provided in all the embodiments of the present disclosure and has the corresponding functional modules and effects for implementing the above methods. Technical details that are not described in detail in this embodiment may be found in the methods provided in all the embodiments of the present disclosure.

Figure 3:
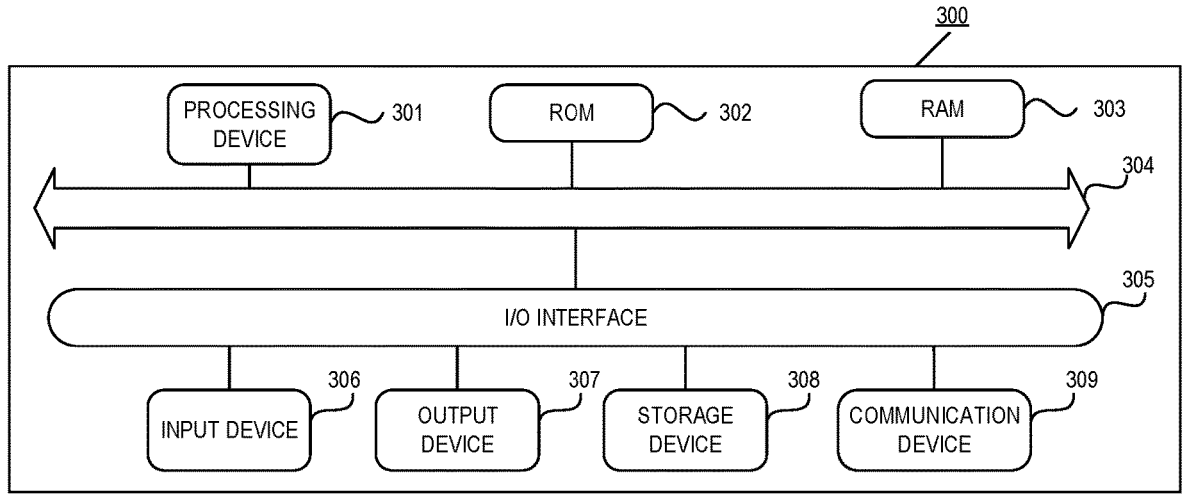
FIG. 3 is a schematic diagram of the structure of an electronic device in the embodiments of the present disclosure.

A reference is now made to FIG. 3, which is a schematic diagram of the structure of an electronic device 300 suitable for implementing the embodiments of the present disclosure. The terminal device 300 in the present disclosure may include but is not limited to a mobile terminal such as a mobile phone, a laptop, a digital broadcast receiver, a personal digital assistant (PDA), a Portable Android Device (PAD), a Portable Media Player (PMP), a vehicle-mounted terminal (such as a vehicle navigation terminal), and a fixed terminal such as a digital television (TV), a desktop computer, etc. The electronic device shown in FIG. 3 is only an example and should not bring any restrictions on the functionality and scope of use of the present disclosure.

As shown in FIG. 3, the electronic device 300 may include a processing device (such as a central processing unit and a graphics processor) 301, which may execute various appropriate actions and processing according to a program stored in a read-only memory (ROM) 302 or a program loaded to a random access memory (RAM) 303 from a storage device 308. Various programs and data required during operation of the electronic device 300 are also stored in the RAM 303. The processing device 301, the ROM 302 and the RAM 303 are connected with one another via a bus 304. An input/output (I/O) interface 305 is also connected to the bus 304.

Generally, the following apparatuses may be connected to the I/O interface 305: an input device 306 including for example a touch screen, a touch pad, a keyboard, a mouse, a camera, a microphone, an accelerometer and a gyroscope; an output device 307 including for example a liquid crystal display (LCD), a speaker and a vibrator; a storage device 308 including for example a magnetic tape and a hard disk; and a communication device 309. The communication device 309 may allow wireless or wired communication between the electronic device 300 and other devices for data exchange. Although FIG. 3 shows the electronic device 300 having various devices, it should be understood that not all the devices shown are necessarily required to be implemented or provided. More or fewer devices may alternatively be implemented or provided.

For example, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flow-charts. In such an embodiment, the computer program may be downloaded and installed from the network via the communication device 309, or installed from the storage device 308, or installed from the ROM 302. The computer program, when executed by the processing unit 301, causes the processing unit to execute the above functions defined in the methods according to the embodiments of the present disclosure.

The computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, a client and a server may communicate using any currently known or future developed network protocol such as HyperText Transfer Protocol (HTTP) and may interconnect with any form or medium of digital data communication (for example, a communication network). Examples of the communication network include a Local Area Network (LAN), a Wide Area Network (WAN), the Internet network (for example, the Internet), and an end-to-end network (for example, an ad hoc end-to-end network), as well as any currently known or future developed networks.

The computer-readable medium may be included in the electronic device described above; or it may exist alone without being assembled into the electronic device.

The computer-readable medium carries one or more programs, and when the one or more programs are executed by the electronic device, causes the electronic device: to obtain a target text and an image to be matched; to input the target text and the image to be matched into an image-text matching model to obtain an image-text matching degree; in response to a determination that the image-text matching degree fails to satisfy a predetermined condition, to determine an optimization parameter based on a predefined strategy, and to optimize the image to be matched based on the optimization parameter to obtain an optimized image to be matched; to input the target text and the optimized image to be matched into the image-text matching model to obtain the image-text matching degree; in response to a determination that the image-text matching degree satisfies the predetermined condition, to determine the image to be matched satisfying the predetermined condition as a target image; and to push the target image and the target text to a user.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or flowcharts can be implemented in a dedicated hardware-based system that performs the specified functions or operations or can be implemented by the combination of dedicated hardware and computer instructions.

The units described in the embodiments of the present disclosure may be implemented by software or hardware. The name of the unit does not constitute a limitation on the unit itself in one case.

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present disclosure, the present disclosure discloses a method of image generation, and the method comprises:

obtaining a target text and an image to be matched;

inputting the target text and the image to be matched into an image-text matching model to obtain an image-text matching degree;

in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree;

in response to a determination that the image-text matching degree satisfies the predetermined condition, determining the image to be matched satisfying the predetermined condition as a target image; and pushing the target image and the target text to a user.

For example, the determining an optimization parameter based on a predefined strategy, and optimizing the image to be matched based on the optimization parameter to obtain an optimized image to be matched comprises:

determining a gradient value based on a gradient backpropagation strategy, and optimizing the image to be matched based on the gradient value to obtain the optimized image to be matched.

For example, obtaining the image to be matched comprises:

generating the image to be matched based on a predetermined random function.

For example, the gradient value is a change amount of color values of a plurality of pixels in the image to be matched, and the optimizing the image to be matched based on the gradient value to obtain an optimized image to be matched comprises:

adjusting the color values of the plurality of pixels in the image to be matched based on the gradient value to obtain the optimized image to be matched.

For example, obtaining the image to be matched comprises:

inputting a pixel coordinate into a first predetermined neural network to obtain the image to be matched; and the determining a gradient value based on a gradient backpropagation strategy, and optimizing the image to be matched based on the gradient value to obtain the optimized image to be matched comprises:

determining a first gradient value based on the gradient backpropagation strategy;

adjusting a parameter in the first predetermined neural network based on the first gradient value; and inputting the pixel coordinate into the adjusted first predetermined neural network to obtain the optimized image to be matched.

For example, obtaining the image to be matched comprises:

inputting a Gaussian vector into a second predetermined neural network to obtain the image to be matched; and the determining a gradient value based on a gradient backpropagation strategy, and optimizing the image to be matched based on the gradient value to obtain the optimized image to be matched comprises:

determining a second gradient value based on the gradient backpropagation strategy;

adjusting the Gaussian vector based on the second gradient value; and inputting the adjusted Gaussian vector into the second predetermined neural network to obtain the optimized image to be matched.

For example, obtaining the image to be matched comprises:

inputting a stroke element into a predetermined renderer to obtain the image to be matched; and the determining a gradient value based on a gradient backpropagation strategy, and optimizing the image to be matched based on the gradient value to obtain an optimized image to be matched comprises:

determining a third gradient value based on the gradient backpropagation strategy;

adjusting the stroke element based on the third gradient value; and inputting the adjusted stroke element into the predetermined renderer to obtain the optimized image to be matched.

For example, obtaining the image to be matched comprises:

randomly selecting a plurality of encoding information from a codebook, and inputting the plurality of encoding information into a predetermined decoder to obtain the image to be matched; and the determining a gradient value based on a gradient backpropagation strategy, and optimizing the image to be matched based on the gradient value to obtain an optimized image to be matched comprises:

determining a fourth gradient value based on the gradient backpropagation strategy;

updating the plurality of encoding information based on the fourth gradient value; and inputting the updated plurality of encoding information into the predetermined decoder to obtain the optimized image to be matched; wherein the updated plurality of encoding information is stored in the codebook.

For example, the image-text matching model is trained by:

obtaining image data and text data;

pairing the image data with the text data to obtain first image-text pairing data as a positive sample;

adjusting pairing relationship between the image data and the text data in the first image-text pairing data to obtain second image-text pairing data as a negative sample; and training the image-text matching model based on the positive sample and the negative sample.

Note that the above is only example embodiments of the present disclosure and the technical principles that are used. Those skilled in the art will understand that the present disclosure is not limited to the specific embodiments herein, and various obvious changes, readjustments, and substitutions may be made without departing from the protection scope of the present disclosure. Therefore, although the present disclosure has been described in detail through the above embodiments, the present disclosure is not limited to the above embodiments. Without departing from the concept of the present disclosure, more further equivalent embodiments may also be included, and the scope of the present disclosure is determined by the scope of the appended claims.

We claim:

1. A method of image generation, comprising:

obtaining a target text and an image to be matched;

inputting the target text and the image to be matched into an image-text matching model to obtain an image-text matching degree;

in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree;

in response to a determination that the image-text matching degree satisfies the predetermined condition, determining the image to be matched satisfying the predetermined condition as a target image; and pushing the target image and the target text to a user, wherein obtaining the target text and the image to be matched comprises:

randomly selecting a plurality of encoding information from a codebook, and inputting the plurality of encoding information into a predetermined decoder to obtain the image to be matched, and wherein determining the optimization parameter based on the predefined strategy, and optimizing the image to be matched based on the optimization parameter to obtain the optimized image to be matched comprises:

determining a gradient value based on a gradient back-propagation strategy, and optimizing the image to be matched based on the gradient value to obtain the optimized image to be matched, wherein the gradient value is amount of change in the encoding information.

2. The method of claim 1, wherein obtaining the image to be matched comprises:

generating the image to be matched based on a predetermined random function.

3. The method of claim 2, wherein the gradient value is a change amount of color values of a plurality of pixels in the image to be matched, and the optimizing the image to be matched based on the gradient value to obtain an optimized image to be matched comprises:

adjusting the color values of the plurality of pixels in the image to be matched based on the gradient value to obtain the optimized image to be matched.

4. The method of claim 1, wherein obtaining the image to be matched comprises:

inputting a pixel coordinate into a first predetermined neural network to obtain the image to be matched; and the determining a gradient value based on a gradient backpropagation strategy, and optimizing the image to be matched based on the gradient value to obtain the optimized image to be matched comprises:

determining a first gradient value based on the gradient backpropagation strategy;

adjusting a parameter in the first predetermined neural network based on the first gradient value; and inputting the pixel coordinate into the adjusted first pre-determined neural network to obtain the optimized image to be matched.

5. The method of claim 1, wherein obtaining the image to be matched comprises:

inputting a Gaussian vector into a second predetermined neural network to obtain the image to be matched; and the determining a gradient value based on a gradient backpropagation strategy, and optimizing the image to be matched based on the gradient value to obtain the optimized image to be matched comprises:

determining a second gradient value based on the gradient backpropagation strategy;

adjusting the Gaussian vector based on the second gradient value; and inputting the adjusted Gaussian vector into the second predetermined neural network to obtain the optimized image to be matched.

6. The method of claim 1, wherein obtaining the image to be matched comprises:

inputting a stroke element into a predetermined renderer to obtain the image to be matched; and the determining a gradient value based on a gradient backpropagation strategy, and optimizing the image to be matched based on the gradient value to obtain an optimized image to be matched comprises:

determining a third gradient value based on the gradient backpropagation strategy;

adjusting the stroke element based on the third gradient value; and inputting the adjusted stroke element into the predetermined renderer to obtain the optimized image to be matched.

7. The method of claim 1, wherein determining a gradient value based on a gradient back-propagation strategy, and optimizing the image to be matched based on the gradient value to obtain an optimized image to be matched comprises:

determining a fourth gradient value based on the gradient backpropagation strategy;

updating the plurality of encoding information based on the fourth gradient value; and inputting the updated plurality of encoding information into the predetermined decoder to obtain the optimized image to be matched; wherein the updated plurality of encoding information is stored in the codebook.

8. The method of claim 1, wherein the image-text matching model is trained by:

obtaining image data and text data;

pairing the image data with the text data to obtain first image-text pairing data as a positive sample;

adjusting pairing relationship between the image data and the text data in the first image-text pairing data to obtain second image-text pairing data as a negative sample; and training the image-text matching model based on the positive sample and the negative sample.

9. An electronic device comprising:

one or more processing devices;

a storage device configured to store one or more programs;

the one or more programs, when executed by the one or more processing devices, cause the one or more processing devices to perform acts comprising:

obtaining a target text and an image to be matched;

inputting the target text and the image to be matched into an image-text matching model to obtain an image-text matching degree;

in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree;

in response to a determination that the image-text matching degree satisfies the predetermined condition, determining the image to be matched satisfying the predetermined condition as a target image; and pushing the target image and the target text to a user, wherein obtaining the target text and the image to be matched comprises:

randomly selecting a plurality of encoding information from a codebook, and inputting the plurality of encoding information into a predetermined decoder to obtain the image to be matched, and wherein determining the optimization parameter based on the predefined strategy, and optimizing the image to be matched based on the optimization parameter to obtain the optimized image to be matched comprises:

determining a gradient value based on a gradient backpropagation strategy, and optimizing the image to be matched based on the gradient value to obtain the optimized image to be matched, wherein the gradient value is amount of change in the encoding information.

10. The electronic device of claim 9, wherein obtaining the image to be matched comprises:

generating the image to be matched based on a predetermined random function.

11. The electronic device of claim 9, wherein the gradient value is a change amount of color values of a plurality of pixels in the image to be matched, and the optimizing the image to be matched based on the gradient value to obtain an optimized image to be matched comprises:

adjusting the color values of the plurality of pixels in the image to be matched based on the gradient value to obtain the optimized image to be matched.

12. The electronic device of claim 9, wherein obtaining the image to be matched comprises:

inputting a pixel coordinate into a first predetermined neural network to obtain the image to be matched; and the determining a gradient value based on a gradient backpropagation strategy, and optimizing the image to be matched based on the gradient value to obtain the optimized image to be matched comprises:

determining a first gradient value based on the gradient backpropagation strategy;

adjusting a parameter in the first predetermined neural network based on the first gradient value; and inputting the pixel coordinate into the adjusted first predetermined neural network to obtain the optimized image to be matched.

13. The electronic device of claim 9, wherein obtaining the image to be matched comprises:

inputting a Gaussian vector into a second predetermined neural network to obtain the image to be matched; and the determining a gradient value based on a gradient backpropagation strategy, and optimizing the image to be matched based on the gradient value to obtain the optimized image to be matched comprises:

determining a second gradient value based on the gradient backpropagation strategy;

adjusting the Gaussian vector based on the second gradient value; and inputting the adjusted Gaussian vector into the second predetermined neural network to obtain the optimized image to be matched.

14. The electronic device of claim 9, wherein obtaining the image to be matched comprises:

inputting a stroke element into a predetermined renderer to obtain the image to be matched; and the determining a gradient value based on a gradient backpropagation strategy, and optimizing the image to be matched based on the gradient value to obtain an optimized image to be matched comprises:

determining a third gradient value based on the gradient backpropagation strategy;

adjusting the stroke element based on the third gradient value; and inputting the adjusted stroke element into the predetermined renderer to obtain the optimized image to be matched.

15. The electronic device of claim 9, wherein determining a gradient value based on a gradient backpropagation strategy, and optimizing the image to be matched based on the gradient value to obtain an optimized image to be matched comprises:

determining a fourth gradient value based on the gradient backpropagation strategy;

updating the plurality of encoding information based on the fourth gradient value; and inputting the updated plurality of encoding information into the predetermined decoder to obtain the optimized image to be matched; wherein the updated plurality of encoding information is stored in the codebook.

16. The electronic device of claim 9, wherein the image-text matching model is trained by:

obtaining image data and text data;

pairing the image data with the text data to obtain first image-text pairing data as a positive sample;

adjusting pairing relationship between the image data and the text data in the first image-text pairing data to obtain second image-text pairing data as a negative sample; and training the image-text matching model based on the positive sample and the negative sample.

17. A non-transitory computer-readable medium storing a computer program, the computer program, when executed by a processing device, performs acts comprising:

obtaining a target text and an image to be matched;

inputting the target text and the image to be matched into an image-text matching model to obtain an image-text matching degree;

in response to a determination that the image-text matching degree fails to satisfy a predetermined condition, determining an optimization parameter based on a predefined strategy, and optimizing the image to be matched based on the optimization parameter to obtain an optimized image to be matched; inputting the target text and the optimized image to be matched into the image-text matching model to obtain the image-text matching degree;

in response to a determination that the image-text matching degree satisfies the predetermined condition, determining the image to be matched satisfying the predetermined condition as a target image; and pushing the target image and the target text to a user, wherein obtaining the target text and the image to be matched comprises:

randomly selecting a plurality of encoding information from a codebook, and inputting the plurality of encoding information into a predetermined decoder to obtain the image to be matched, and wherein determining the optimization parameter based on the predefined strategy, and optimizing the image to be matched based on the optimization parameter to obtain the optimized image to be matched comprises:

determining a gradient value based on a gradient back-propagation strategy, and optimizing the image to be matched based on the gradient value to obtain the optimized image to be matched, wherein the gradient value is amount of change in the encoding information.

\*　\*　\*　\*　\*